Aug. 22, 1933.  A. PELTZER ET AL  1,923,455
MILL STARCH TREATMENT AND METHOD
Filed April 5, 1932    2 Sheets-Sheet 1
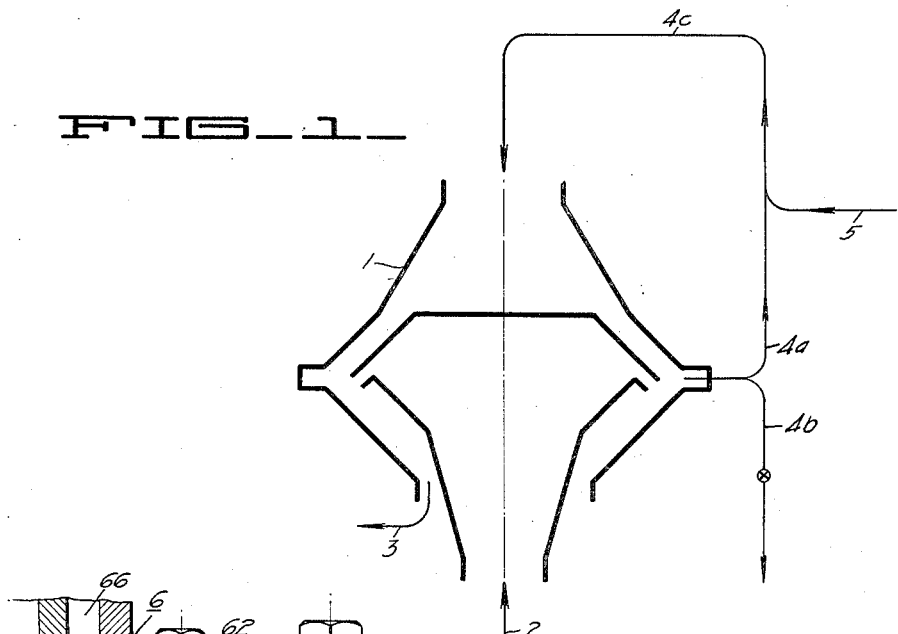
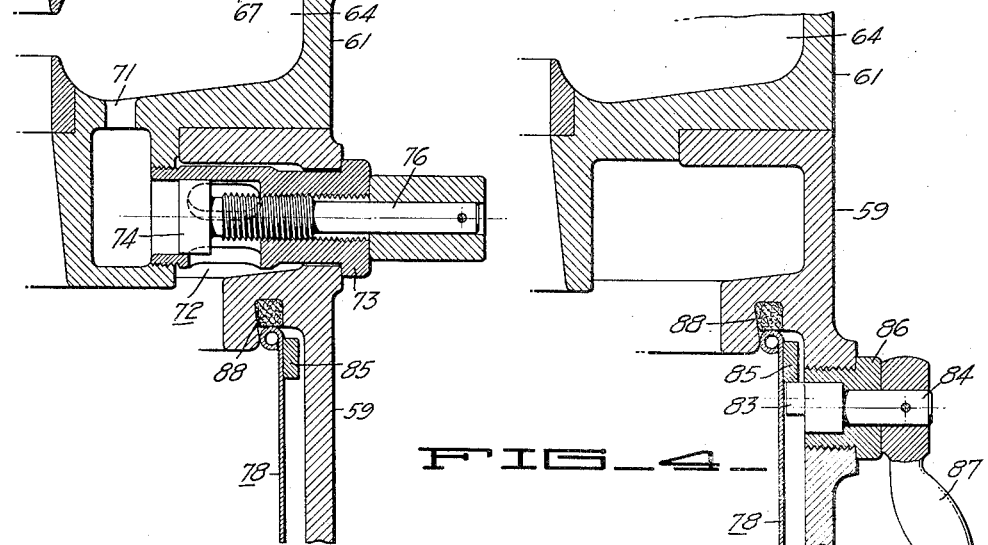
INVENTORS.
Albert Peltzer
Albert Peltzer Jr.
BY
ATTORNEYS.

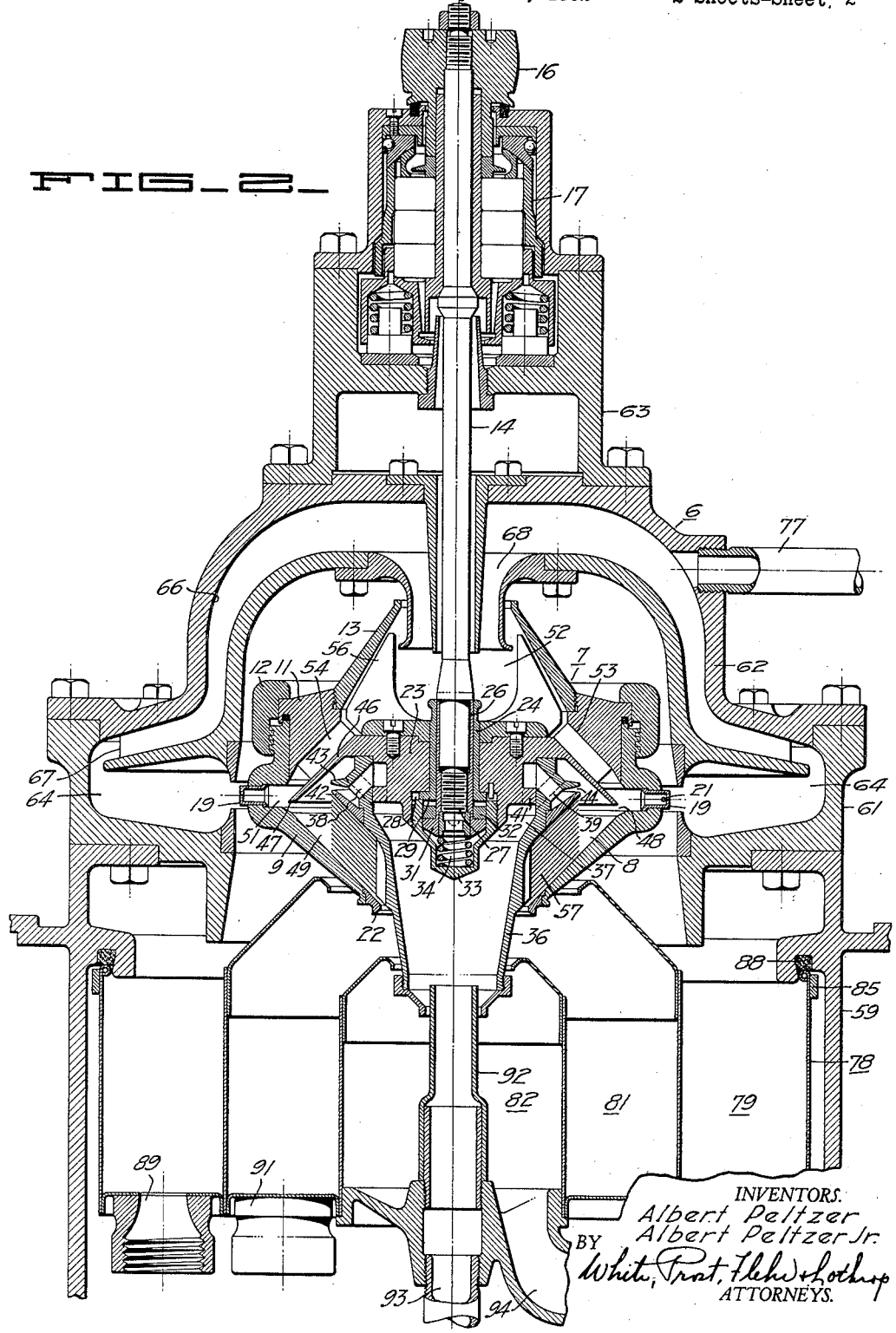

Patented Aug. 22, 1933

1,923,455

UNITED STATES PATENT OFFICE 1,923,455

MILL-STARCH TREATMENT AND METHOD

Albert Peltzer and Albert Peltzer, Jr., Palo Alto, Calif., assignors to Merco Centrifugal Separator Co. Ltd., San Francisco, Calif., a Corporation of California Application April 5, 1932. Serial No. 603,354

5 Claims. (Cl. 127—69)

This invention relates generally to methods of treating mill starch for the separation of starch particles from gluten.

In the manufacture of commercial starch, as for example from Indian corn, it has been common to treat the corn by successive stages to form what is known as "mill starch". This treatment generally includes steeping the corn in vats with water at an elevated temperature, a crushing of the corn kernels, and subsequent removal of germs, hulls and other fibrous material. The resulting mill starch contains, mixed with water, the gluten and other nitrogenous substances ranging from solids to colloids and dissolved solubles, together with starch and some impurities. This material also contains a certain amount of sulphur dioxide ($SO_2$) which is added during the milling operation. In the past mill starch has been treated to a separating process, commonly known as tabling, to separate the starch from the gluten. The separated starch together with water in which the starch particles are suspended, which can be termed an "underflow" from the tabling process, is then treated in suitable filters or like means to separate the starch from the water and from some of the impurities which can be removed by filtering.

Among other disadvantages, tabling of the mill starch to effect the desired separation requires a relatively long period of treatment, which limits the capacity of the mill and which affords an opportunity for bacteriological growth. It also fails to secure a separation which is as perfect as desired for a high grade product. Mill starch is peculiar in that the starch particles tend to be surrounded or coated by a colloidal film even though the major portion of the gluten is present in flocculated form (due to the $SO_2$ concentration). Gravity separation and ordinary washing, employed in tabling, cannot remove this film, and therefore, the resulting starch is contaminated.

It is an object of the present invention to provide a method of treating mill starch which will be more effective in the separation of starch from gluten and other impurities, than prior methods outlined above. Our new method is characterized by the fact that it involves a relatively short period of treatment whereby growth of undesired bacteria is inhibited, and also by a scrubbing of the starch particles to remove adhering colloidal matter.

It is a further and more specific object of the invention to provide a novel centrifuge method for the separation of starch from gluten. This centrifuge method is characterized by repeated scrubbing and rescrubbing of starch particles to remove adhering colloidal matter, and also by simultaneous washing away of gluten from the starch particles during the centrifuge operation.

Further objects of the invention will appear from the following description in which the preferred embodiments of the invention, together with a suitable apparatus for carrying out the same, are set forth in detail in conjunction with the accompanying drawings. It is to be understood that the appended claims are to be accorded a range of equivalents consistent with the state of the prior art.

Referring to the drawings:

Fig. 1 illustrates diagrammatically a centrifuge method incorporating the present invention.

Fig. 2 is a side elevational view, in cross section illustrating a suitable form of apparatus to be utilized in our method.

Fig. 3 is a cross sectional detail illustrating valve means for controlling the amount of underflow material withdrawn for final delivery.

Fig. 4 is a cross sectional detail illustrating suitable means for detachably securing a material receiving receptacle to the main housing of the machine.

Our method can best be understood after a description of the apparatus illustrated in Figs. 2 to 4 inclusive. The centrifuge illustrated therein consists of a housing indicated generally at 6, within which there is a rotating structure 7. Structure 7 is formed to provide a centrifuge chamber 8, adapted to receive a fluid feed material, and which is also adapted for the separate discharge of a centrifugally separated underflow and overflow. For manufacturing convenience, structure 7 is formed of a plurality of parts, one part 9 forming the lower part of the structure, another annular part 11 which is secured to part 9 by ring 12, and an upper conical part 13, which is secured to part 11 by means of a threaded engagement. The entire structure 7 is mounted on the lower end of a drive shaft 14, the upper end of this shaft being supplied with a drive pulley 16 and being supported by suitable bearing 17.

For enabling the discharge of the underflow, that is, the heavier separated material from the chamber 8, tubular nozzles 19 are provided at circumferentially spaced points on the sides of the wall part 9. These nozzles 19 have discharge orifices 21 directed backwardly with respect to the direction of rotation of structure 7. The overflow, that is, the lighter centrifugally separated material, is adapted to be discharged over an annular weir 22, formed at the lower end of part 9.

For a proper understanding of the provision for introducing feed material into the centrifuge chamber, it will be necessary to describe the structure interposed between the lower end of shaft 14 and the outer portion of structure 7. It will be noted that part 11 is provided with an inner hub 23 which surrounds the lower end of shaft 14. Interposed between shaft 14 and hub 23, there is a pair of interfitting sleeves 24 and 26. Sleeve 26 is secured to shaft 14 by a threaded connection 27. The lower side of hub 23 is provided with a counter-bore 28 to accommodate an annular shoulder 29, formed on the lower end of sleeve 24. The lower end of sleeve 26 is likewise provided with an annular shoulder 31 and interposed between shoulders 29 and 31 there is a slip ring 32. Cap 33 is threaded into counter-bore 28 and interposed between this cap and the lower end of sleeve 26, there is a compression spring 34. Compression spring 34 serves to urge shoulders 29 and 31 together upon the faces of ring 32 so as to form a universal joint.

Depending from hub portion 23 there is an inverted, truncated, conical section 36, into which feed material is adapted to be introduced as will be presently explained. The upper part of section 36 forms together with hub 23, an annular feed chamber 37. From feed chamber 37 the feed material is delivered into the centrifugal chamber 8 through two different sets of ports or ducts. One set of ducts 38 is spaced circumferentially and is inclined upwardly and outwardly. Another set of ducts 39 is likewise spaced circumferentially, but staggered with respect to ducts 38 and inclined downwardly and outwardly. The inner end of duct 39 communicates with the ducts 41. Adjacent the discharge end of ducts 38 there is an inverted conical deflector 42, which together with annular edge 43 serves to form an annular discharge orifice 44 for feed material. Therefore feed material being discharged through ducts 39 is deflected upwardly and outwardly by deflector 42 and is discharged into the centrifugal chamber through the orifice 44.

In order to cause all of the feed material discharged through annular orifice 44 and ducts 38 to flow outwardly and downwardly, towards the periphery of the centrifuge chamber along a conical surface, there is a truncated conical wall portion 46 which may be integral with hub 23 and part 11. The outer edge 47 of portion 46 is so positioned as to form an annular opening 48 through which material must flow as it passes through the chamber by centrifugal force. Wall portion 46 therefore in effect divides the centrifuge chamber into two portions 49 and 51, the portion 51 being in direct communication with the discharge nozzles 19. Chamber portion 51 is also in communication with an upper auxiliary feed chamber 52, through downwardly and outwardly inclined passages 53, separated by webs 54. Feed chamber 52 is adapted to receive heavier material previously discharged from the centrifuge chamber, and to deliver the same back into the chamber portion 51 by way of passages 53. To impart rotary energy to material in feed chamber 52, vanes 56 are provided, which can be suitably mounted upon the upper face of hub 23.

To aid in effecting efficient separation, a plurality of spaced conical disks 57 are disposed within the chamber portion 49, and concentric with the axis of shaft 14.

To properly understand the manner in which the feed material is introduced into the rotating structure 7, and the centrifuge chamber, how the underflow and overflow discharges are handled after their delivery, and how the material is returned by way of the auxiliary feed chamber 52, it is necessary to describe the structure of housing 6. This housing is shown formed of a plurality of separable sections, the sections being numbered 59, 61, 62 and 63, and which are secured together by suitable means such as bolts. Section 59 forms a base or support, sections 61 and 62 form a volute for receiving the underflow and for effecting a return of a portion thereof back into the auxiliary feed chamber 52, while sections 63 serve to support the journal 17 of shaft 14. The volute formed by sections 61 and 62 includes an annular chamber 64 which surrounds the discharge nozzles 19. It also includes passages 66 extending upwardly and inwardly and which are separated by webs 67. The upper ends of passages 66 communicate with the upper end of a depending conduit 68, the lower end of which is disposed within the auxiliary feed chamber 52.

Referring to Fig. 3, a portion of the underflow discharged into annular chamber 64 can be diverted from the apparatus through a port 71 and manually adjustable valves 72. The particular form of valve 72 illustrated consists of a ported sleeve 73, forming a cylinder adapted to receive the sliding valve plug 74. Valve plug 74 can be adjusted by turning stem 76, to more or less restricted flow of material through the valve. Also communicating with passages 66 there is a pipe 77 whereby additional fluid material can be intermixed together with a portion of the underflow for return to the auxiliary chamber 52.

Disposed within the lower housing section 59 there is a receiving vessel 78 formed to provide a plurality of annular compartments 79, 81 and 82. To facilitate attachment and removal of this receiving vessel, means is provided such as shown in Fig. 4. In this case, the upper edge of the outer wall of receiving vessel 78 is provided with a rim 85 adapted to be engaged by cam member 83. Cam member 83 is mounted upon a shaft 84 which in turn is journaled within a bushing 86. This bushing is mounted in the side wall of housing section 59. A handle 87 is secured to the outer end of shaft 84, to enable manual turning movement to engage or disengage member 83 with rim 85. It is preferable to provide a plurality of such devices spaced about the housing section 59 so that the upper edge of receiving vessel can be tightly engaged with a sealing ring 88. The outer receiving vessel compartment 79 is adapted to receive underflow material flowing through valve 72, and from this compartment the material can be removed through an outflow opening 89. The inner compartment 81 receives the overflow material being discharged over weir 22 and from this compartment the material can be removed through opening 91. Extending upwardly from the center of the receiving vessel 78 and within the inner compartment 82, there is a conduit 92, which, when the receiving vessel 78 is in normal position, has its upper end extending into the lower end of conical portion 36. Feed material is introduced into conduit 92 by way of pipe 93. Any spill of feed material is caught by the inner compartment 82 and can be removed by way of opening 94.

The machine described above has been diagrammatically illustrated in Fig. 1, to clarify the method involved when the machine is utilized in accordance with our invention for the treatment of mill starch. Numeral 1 in this diagram represents the centrifuge machine just described, and line 2 represents introduction of mill starch into the machine. Lines 3 represent a gluten overflow, while line 4a represents an underflow consisting largely of starch particles. A controlled portion of the underflow, designated 4b is removed for final delivery. The remaining portion is indicated by line 4c as being returned back into the centrifuge. Line 5 indicates introduction of wash liquor, as for example clear water, into the return circuit. To compare Fig. 1 with the actual machine of Fig. 2, line 2 of Fig. 1 is representative of conduit 92 of Fig. 2. Lines 3 of Fig. 1 are representative of the discharge of lighter separated material over weir 22 of Fig. 2. Lines 4a and 4b of Fig. 1 are representative of discharge of heavier material from the orifices 21 of Fig. 2. Final delivery indicated by number 4b in Fig. 1, is by way of port 71 and the manually controlled valve illustrated in Fig. 3. The return 4c of Fig. 1 is representative of annular chamber 64, passages 66, and depending conduit 68 of Fig. 2.

To describe our method of treating mill starch, assuming that the machine of Figs. 2 to 4 inclusive is utilized, mill starch is continuously fed through conduit 92, from the upper end of which it is continuously introduced into the inverted conical portion 36. As the mill starch moves upwardly to the interior of portion 36, by virtue of centrifugal force, a preliminary classification takes place. From this preliminary classification the heavier classified material of the mill starch is discharged from chamber 36 through conduit 38 upon the inner surface of the conical wall portion 46. The lighter component resulting from the preliminary classification flows through conduits 41 and 39 through annular orifice 44, and then into the centrifuge chamber portion 49. The heavier starch particles of the feed, by virtue of the centrifugal force to which they are subjected, are moved towards the periphery of the centrifuge chamber and through the orifice 48. The lighter centrifugally separated material consisting largely of gluten, flows towards the center of rotation, and discharges over weir 22. The underflow consisting principally of starch particles together with water, discharges continually through nozzles 19, and by virtue of the kinetic energy of the discharge, a portion of this underflow is caused to flow upwardly and inwardly through passages 66, and to be redelivered into auxiliary feed chamber 52. The remainder of the underflow is diverted through valve 72 to the outer receiving vessel compartment 79, for final delivery. That portion of the underflow which is returned into the auxiliary feed chamber 52 flows outwardly through passages 53, and is discharged into the outer portion 51 of the centrifuge chamber. Wash liquor, as for example fresh water is continuously introduced by way of pipe 77. This wash liquor intermixes with the underflow being returned into centrifuge by way of passages 66 and is likewise delivered together with this returned underflow into portion 51 of the centrifuge chamber.

One characteristic of our method is the proportioning of the return of underflow, with respect to the rate of removal by way of valve 72. Preferably, for a given rate of mill starch feed, the rate of return of underflow is considerably greater than the rate with which a portion of the underflow is diverted for final delivery. A ratio which has given good results is about ten to one, that is, the rate of return of underflow discharged from the nozzles is about ten times greater than the rate of removal of underflow for final delivery.

Before pointing out the advantage of providing a proportioning such as described above, between the rate of return and the rate of removal for final delivery, certain other characteristic features of our method will be pointed out. One important feature is that a scrubbing action of the startch particles in the underflow takes place, as this underflow flows through nozzles 19, and orifices 21. This scrubbing action occurs because the flow of material is at relatively high velocity, due to the use of a relatively high speed of rotation for the centrifuge rotor. By way of example, rather than by way of limitation, in a centrifuge used successfully in our method, having a rotor of about 9 inches in diameter, the speed of rotation is in the neighborhood of 5400 revolutions per minute. High velocity flow through nozzles 19, and orifices 21, necessarily sets up violent turbulence within the stream of material, and this turbulence causes a scrubbing of the starch particles. We have found that this scrubbing action plays an important part in our method, as it tends to free the starch particles of adhering films of colloidal materials.

A scrubbing action also takes place in another part of the machine, namely, in the centrifuge chamber portion 51 adjacent the inlets to the nozzles 19. Scrubbing action in this region is likewise caused by turbulence or violent agitation. Such turbulence or violent agitation results from an exchange of energy between the material returned into the centrifuge chamber by way of auxiliary feed chamber 52, and the material separated from the mill starch feed which flows into chamber portion 51 through annular orifice 48. Agitation within chamber portion 51 not only serves the useful purpose of scrubbing separated starch particles, but also serves to scour out the adjacent surfaces of the rotor, to prevent clogging of nozzles 19, and to prevent accumulations of solid materials. The rate of return of the underflow discharge is adjusted in such a manner, that the additional wash liquor introduced by way of pipe 77, does not all discharge through nozzles 19 with discharged particles, but part of it is caused to counterflow through the chamber portion 49, to be discharged from the rotor together with the separated gluten over weir 22. This counterflow of wash liquor likewise serves several useful purposes. Because it is mixed with the underflow and introduced into centrifuge chamber portion 51, its flow inwardly through centrifuge chamber portion 49, causes this liquid to carry with it a certain amount of gluten scrubbed from the starch particles in centrifuge portion 51. Likewise the counterflow of the wash liquor through centrifuge portion 49 assists in effecting separation between the starch and gluten of the original mill starch feed. If desired the amount of wash liquor can be so adjusted as to tend to produce a quiescent zone of separation within the rotor. Such a method has been described and claimed in our co-pending application Serial Number 483,874, filed September 23, 1930.

In view of the above described characteristics of our method, it is evident that as the material in the centrifuge is being treated, scrubbing of starch particles occurs within the region of chamber portion 51, and likewise within nozzles 19 and orifices 21. Likewise the portion of the colloidal gluten being scrubbed from the starch particles within the region of chamber portion 51, is being continually carried away by the counter-flowing wash liquor, together with the overflow. It will now be appreciated that the return of a major part of the underflow back into the centrifuge rotor, continually resubjects the underflow material to scrubbing of the starch particles, and also to further separation. The net result is that the relatively small quantity of the underflow which is diverted for final delivery through valve 72 is substantially uncontaminated with gluten or other solubles in the mill starch. In fact the purity of the product attained far exceeds that which can be attained by prior commercial methods.

Our method is particularly adapted to be substituted for present tabling methods in the manufacture of corn starch, not only as it produces a purer product but also because the treatment requires a minimum of time, and therefore there is little opportunity for bacteriological growth. Likewise within the machine itself, solids such as might cause bacteriological growth do not accumulate, due to the rapid flow of material. Instead of applying our method direct to the mill starch, it is obviously possible to first treat the mill starch to preliminary separation, and then treat the heavier material from this preliminary treatment, in accordance with our method. We have also found it practical to utilize two or more machines similar to that illustrated in Figs. 2 to 4 inclusive, one operating directly upon mill starch, but adjusted so as not to produce a sharp separation, and the second operating in accordance with our method and being fed with the underflow from the first centrifuge.

We claim:

1. In a method of treating mill starch for effecting separation of starch from gluten, characterized by the use of a centrifuge chamber having orifices for the discharge of a heavier underflow and also having provision for the discharge of a lighter overflow, the steps of continually feeding mill starch to said chamber, permitting an overflow containing starch particles centrifugally separated from the feed to discharge through said nozzles at sufficient velocity to cause a scrubbing action of said particles, causing separated material to continually discharge from the bowl as a lighter overflow, and continually returning the major quantity of the material discharged from said nozzles back to said chamber for rescrubbing and reseparation.

2. In a method of treating mill starch for effecting separation of starch from gluten characterized by the use of a centrifuge chamber having orifices for the discharge of a heavier underflow and also having provision for the discharge of a lighter overflow, the step of continually feeding mill starch to said chamber, permitting an underflow containing starch particles centrifugally separated from the feed to discharge through said nozzles at sufficient velocity to cause a scrubbing action of said particles, continually returning the major quantity of the underflow back to said chamber for rescrubbing and reseparation, continually adding wash liquor to the material so returned, and causing at least part of said wash liquor to flow counter-currently through said chamber and discharge together with said overflow.

3. In a method of treating mill starch for effecting separation of starch from gluten characterized by the use of a centrifuge chamber having orifices for the discharge of heavier separated material and also having provision for the discharge of a lighter gluten overflow, the steps of continually feeding mill starch to said chamber, permitting an underflow containing separated starch particles to discharge through said nozzles, and continually returning the major quantity of the underflow back to said chamber in such a manner as to form a scrubbing zone between the inlets to said nozzles and the region of centrifugal separation within the chamber.

4. In a method of treating mill starch for effecting separation of starch from gluten, characterized by the use of a centrifuge chamber having orifices for the discharge of heavier separated material and also having provision for the discharge of a lighter gluten overflow, the steps of continually feeding mill starch to said chamber, permitting a heavier underflow to discharge through said orifices consisting of separated starch particles together with liquid, and continually returning the major quantity of the underflow back to said chamber in such a manner as to form a zone of agitation and scrubbing between the inlets to said nozzles and the region of centrifugal separation within the chamber.

5. In a method of treating mill starch for effecting separation of starch from gluten, characterized by the use of a centrifuge chamber having orifices for the discharge of heavier separated material and also having provision for the discharge of a gluten overflow, the steps of continually feeding mill starch to said chamber, permitting an underflow containing separated starch to discharge through said nozzles at sufficient velocity to cause a scrubbing action of the starch particles, causing separated gluten to continually discharge from the bowl with the lighter overflow, continually returning the major quantity of the underflow back to said chamber in such a manner as to cause a scrubbing zone to be formed adjacent the inlets to said nozzles, and continually adding wash liquor to said returned material and causing at least part of said wash liquor to flow counter-currently through said chamber and discharge together with the lighter overflow.

ALBERT PELTZER.
ALBERT PELTZER, JR.

CERTIFICATE OF CORRECTION.

Patent No. 1,923,455.   August 22, 1933.

ALBERT PELTZER, ET AL.

It is hereby certified that error appears in the printed specification of the above numbered patent requiring correction as follows: Page 4, line 44, claim 1, for "overflow" read "underflow"; and that the said Letters Patent should be read with this correction therein that the same may conform to the record of the case in the Patent Office.

Signed and sealed this 17th day of October, A. D. 1933.

F. M. Hopkins (Seal)   Acting Commissioner of Patents.